US011584658B2

(12) United States Patent
Hagelin-Weaver et al.

(10) Patent No.: US 11,584,658 B2
(45) Date of Patent: Feb. 21, 2023

(54) COMPOSITIONS, METHODS OF MAKING COMPOSITIONS, AND HYDROGEN PRODUCTION VIA THERMO-CHEMICAL SPLITTING

(71) Applicant: University of Florida Research Foundation, Inc., Gainesville, FL (US)

(72) Inventors: Helena Hagelin-Weaver, Gainesville, FL (US); Samantha Roberts, Hillsboro, OR (US); Nathan Carr, Bradenton, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/730,736

(22) Filed: Apr. 27, 2022

(65) Prior Publication Data

US 2022/0267163 A1 Aug. 25, 2022

Related U.S. Application Data

(62) Division of application No. 16/943,522, filed on Jul. 30, 2020, now abandoned.

(60) Provisional application No. 62/881,483, filed on Aug. 1, 2019.

(51) Int. Cl.
*C01F 17/224* (2020.01)
*C01F 17/241* (2020.01)
*C01F 17/10* (2020.01)
*C01B 3/06* (2006.01)

(52) U.S. Cl.
CPC ............ *C01F 17/241* (2020.01); *C01B 3/061* (2013.01); *C01F 17/10* (2020.01); *C01F 17/224* (2020.01)

(58) Field of Classification Search
CPC ...... C01F 17/10; C01F 17/224; C01F 17/241; C01B 3/061
See application file for complete search history.

(56) References Cited

U.S. PATENT DOCUMENTS

| 6,656,588 | B1 | 12/2003 | Laine et al. |
| 2017/0152421 | A1 | 6/2017 | Ohtake et al. |
| 2018/0065109 | A1 | 3/2018 | Baker et al. |

OTHER PUBLICATIONS

R.R. Bhosale, G. Takalkar, P. Sutar, A. Kumar, F. AlMomani, M. Khraisheh, "A decade of ceria based solar thermochemical H2O/CO2 splitting cycle," Int. J. Hydrogen Energy 44 (2019) 34-60.
Y. Lu, L. Zhu, C. Agrafiotis, J. Vieten, M. Roeb, C. Sattler, Solar fuels production: Two-step thermochemical cycles with cerium-based oxides, Prog. Energy Comb. Sci. 75 (2019) 100785 (49 pp).
A. Haeussler, S. Abanades, J. Jouannaux, M. Drobek, A. Ayral, A. Julbe, Recent progress on ceria doping and shaping strategies for solar thermochemical water and CO2 splitting cycles, AIMS Materials Science, 6(5) (2019) 657-684.
L. Zhu, Y. Lu, "Reactivity and Efficiency of Ceria-Based Oxides for Solar CO2 Splitting via Isothermal and Near-Isothermal Cycles," Energy Fuels 32 (2018) 736-746.
R.R. Bhosale, G.D. Takalkar, "Nanostructured co-precipitated Ce0.9Ln0.1O2 (Ln=La, Pr, Sm, Nd, Gd, Tb, Dy, or Er) for thermochemical conversion of CO2," Ceram. Int. 44 (2018) 16688-16697.
R. Jacot, R. Moré, R. Michalsky, A. Steinfeld, G.R. Patzke, "Trends in the phase stability and thermochemical oxygen exchange of ceria doped with potentially tetravalent metals," J. Mater. Chem. A 5 (2017) 19901-19913.
A. Bonk, A.C. Maier, M.V.F. Schlupp, D. Burnat, A. Remhof, R. Delmelle, A. Steinfeld, U.F. Vogt, "The effect of dopants on the redox performance, microstructure and phase formation of ceria," J. Power Sources 300 (2015) 261-271.
Q.-L. Meng, C.-I. Lee, H. Kaneko, Y. Tamaura, "Solar thermochemical process for hydrogen production via two-step water splitting cycle based on Ce1-xPrxO2-δ redox reaction," Thermochim. Acta 532 (2012) 134-138.
G. Takalkar, R.R. Bhosale, F. AlMomani S. Rashid, "Co-precipitation synthesized nanostructured Ce0.9Ln0.05Ag0.05O2-☐ materials for solar thermochemical conversion of CO2 into fuels," J. Mater. Sci. 55 (2020) 9748-9761.
D. Arifin, A. Ambrosini, S.A. Wilson, B. Mandal, C.L. Muhich, A.W. Weimer, "Investigation of Zr, Gd/Zr, and Pr/Zr—doped ceria for the redox splitting of water," Int. J. Hydrogen Energy 45 [1] (2020) 160-174.
B. Zhao, C. Huang, R. Ran, X. Wu, D. Weng, "Two-step thermochemical looping using modified ceria-based materials for splitting CO2," J. Mater. Sci. 51 (2016) 2299-2306.
Q.-L. Meng, Y. Tamaura, "Enhanced hydrogen production by doping Pr into Ce0.9Hf0.1O2 for thermochemical two-step water-splitting cycle," J. Phys. Chem. Solids 75 (2014) 328-333.
Le Gal A, Abanades S, Bion N, Le Mercier T, Harle V. "Reactivity of Doped Ceria-Based Mixed Oxides for Solar Thermochemical Hydrogen Generation via Two-Step Water-Splitting Cycles," Energy Fuels 27 (2013) 6068-6078.
H.P. Dasari, K. Ahn, S.-Y.Park, H.-I. Ji, K.J. Yoon,B.-K. Kim, H.-J. Je, H.-W. Lee, J.-H. Lee, "Hydrogen production from water-splitting reaction based on RE-doped ceria-zirconia solid-solutions," Int. J. Hydrogen Energy 38 (2013) 6097-6103.
C.-I. Lee, Q.-L. Meng, H. Kaneko, Y. Tamaura, "Dopant effect on hydrogen generation in two-step water splitting with CeO2-ZrO2-MOx reactive ceramics," Int. J. Hydrogen Energy 38 [36] (2013) 15934-15939.
I. Popescu, J.C. Martínez-Munuera, A. García-García, I.-C. Marcu, "Insights into the relationship between the catalytic oxidation performances of Ce-Pr mixed oxides and their semiconductive and redox properties," Appl. Catal. A 578 (2019) 30-39, and references therein.
H.G. Seo, Y. Choi, W.C. Jung, "Exceptionally Enhanced Electrode Activity of (Pr,Ce)O2-delta-Based Cathodes for Thin-Film Solid Oxide Fuel Cells," Adv. Energy Mater. 8 (2018) 1703647.

(Continued)

*Primary Examiner* — Steven J Bos
(74) *Attorney, Agent, or Firm* — Thomas Horstemeyer, LLP

(57) ABSTRACT

The present disclosure provides for compositions, methods of making compositions, and methods of using the composition. In an aspect, the composition can be a reactive material that can be used to split a gas such as water or carbon dioxide.

8 Claims, 10 Drawing Sheets

(56) References Cited

OTHER PUBLICATIONS

C. Agrafiotis, M. Pein, D. Giasafaki, S. Tescari, M. Roeb, C. Sattler, "Redox Oxides-Based Solar Thermochemistry and Its Materialization to Reactor/Heat Exchanger Concepts for Efficient Solar Energy Harvesting, Transformation and Storage," J. Sol. Energy Eng. 141 (2019) 021010 (11 pages).

He, H., et al., "Defective structure, oxygen mobility, oxygen storage capacity, and redox properties of RE-based (RE = Ce, Pr) solid solutions," Catalysis Today, vol. 90 (2004) pp. 245-254.

Zhou, Gong, et al., Thermodynamic Investigation of the Redox Properties for Ceria-Haftlia, Ceria-Terbia, and Ceria Praseodymia Solid Solutions, J. Phys. Chem.B, vol. 112, No. 32 (2008), pp. 9869-9875.

Pu, Zhi-Ying, et al., "Enhanced Activity for CO Oxidation over Pr- and Cu-Doped Ce02 Catalysts: Effect of Oxygen Vacancies," J. Phys. Chem. C, vol. 112, No. 38 (2008), pp. 15045-15051.

Narula, C. K., et al., Single-Phase $PrO_y-ZrO_2$ Materials and Their Oxygen Storage Capacity: A Comparison with Single-Phase $CeO_2-Zr)_2$, $PrO_y-CeO_2$, and $PrO_y-CeO_2-ZrO_2$ Materials, J. Phys. Chem. B, vol. 103, No. 18 (1999), pp. 3634-3639.

Zhu, Zhen-Feng, et al., Influence of Combustion Additive on the Structure and Properties of $Pr-CeO_2$ Powder Prepared by Low-Temperature Combustion Synthesis (LCS), Journal of Synthetic Crystals, vol. 36, No. 2 (2007) (5 pages).

Vanova, O. S., et al., "Homogeneous Precipitation of SUB-10 Nm $Ce1-xRxO_2-\delta$(R=Pr, Nd, Sm, Eu, Gd, Yb) Solid Solution," Proceedings of International Conference Nanomeeting, Physics, Chemistry and Applications of Nanostructures—Reviews and Short Notes, Minsk, Belarus, May 24-27, 2011 (5 pages).

Greenblatt, M., et al., Hydrothermal Synthesis and Properties Of $Ce1-xMxO_2-\delta$ (M=La, Bi, Sm, Pr, Fb) Solid Solutions, Mat. Res. Soc. Symp. Proc. Vol. 548, Materials Research Society (1999), pp. 511-517.

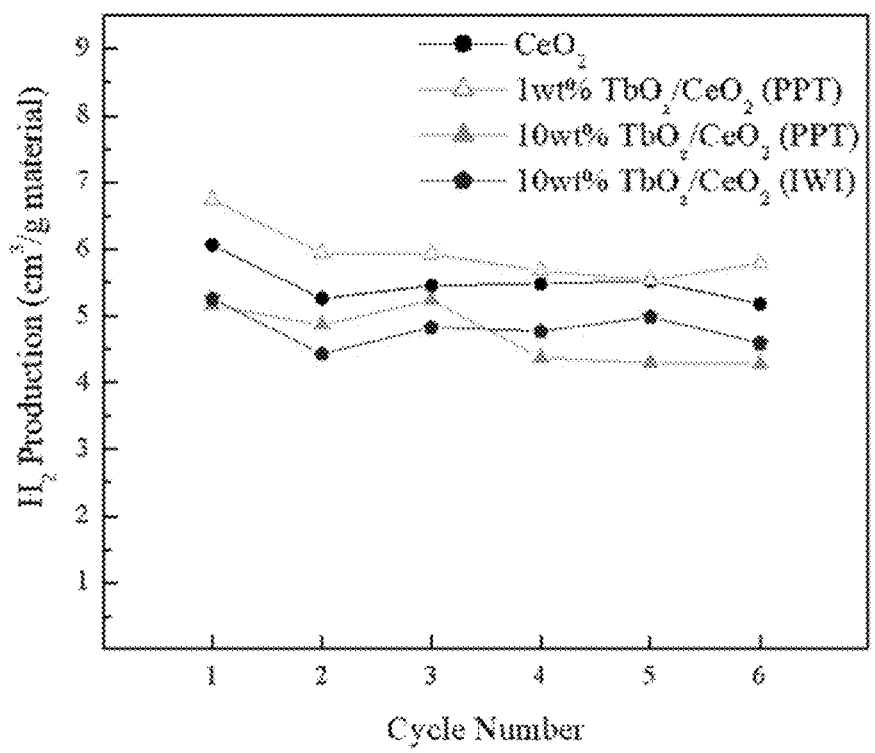
FIG. 1.1
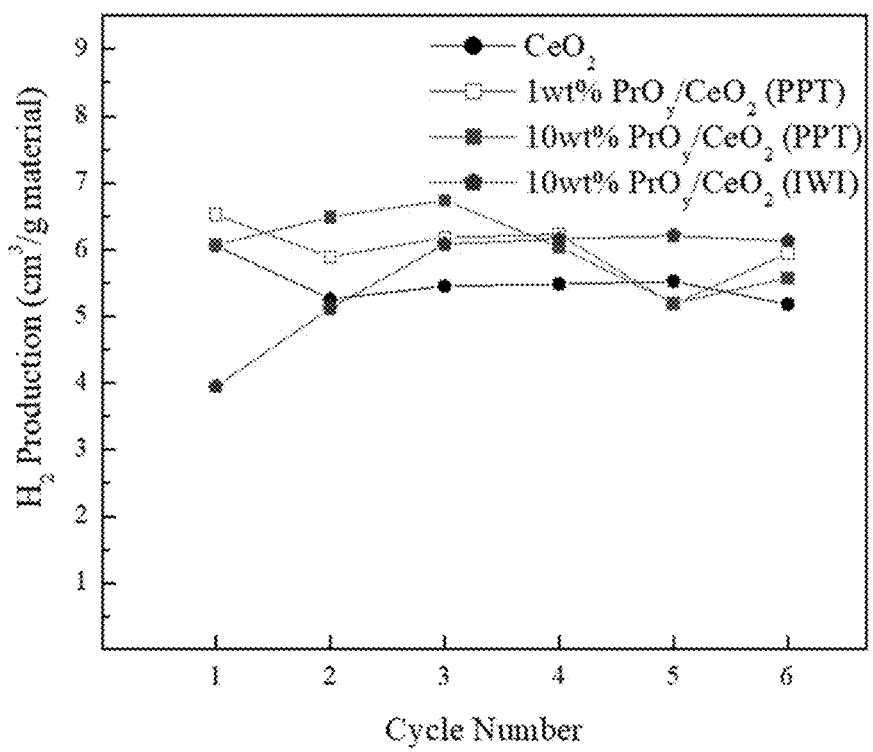
FIG. 1.2

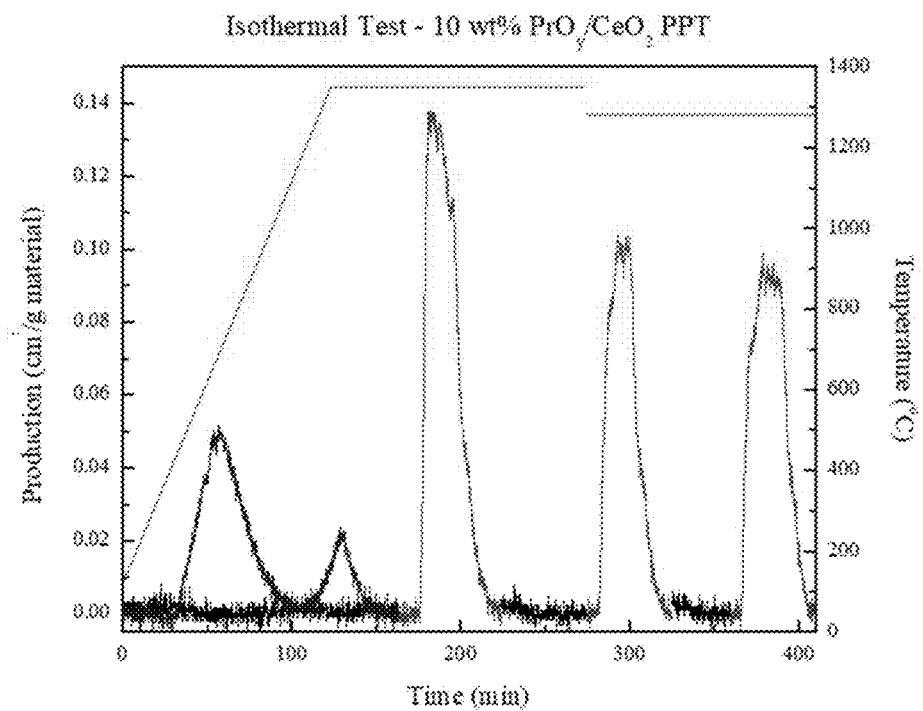
FIG. 1.3
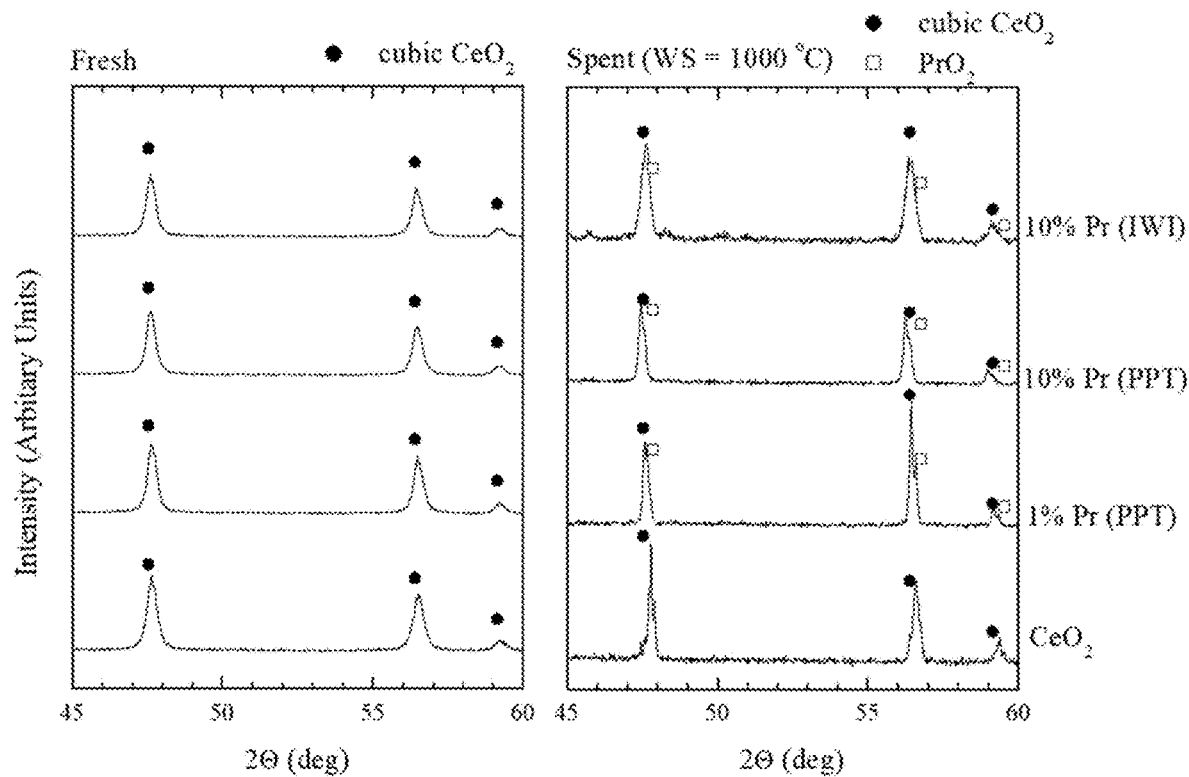
FIG. 1.4

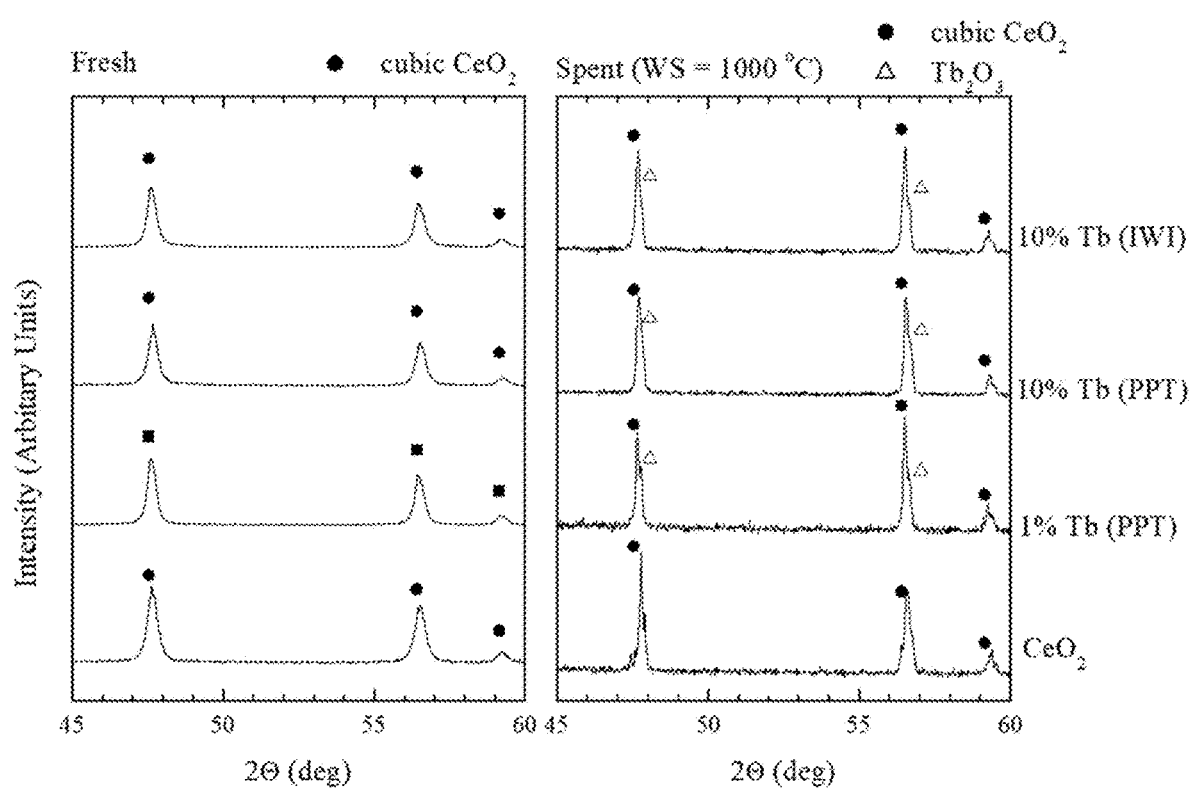
FIG. 1.5

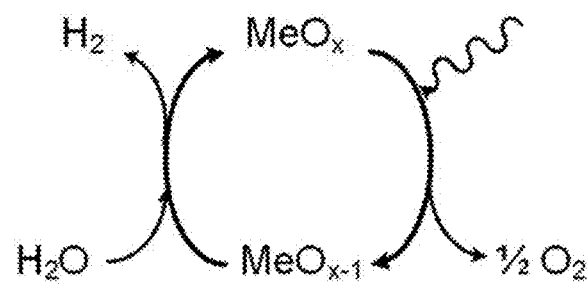
FIG. 2.1
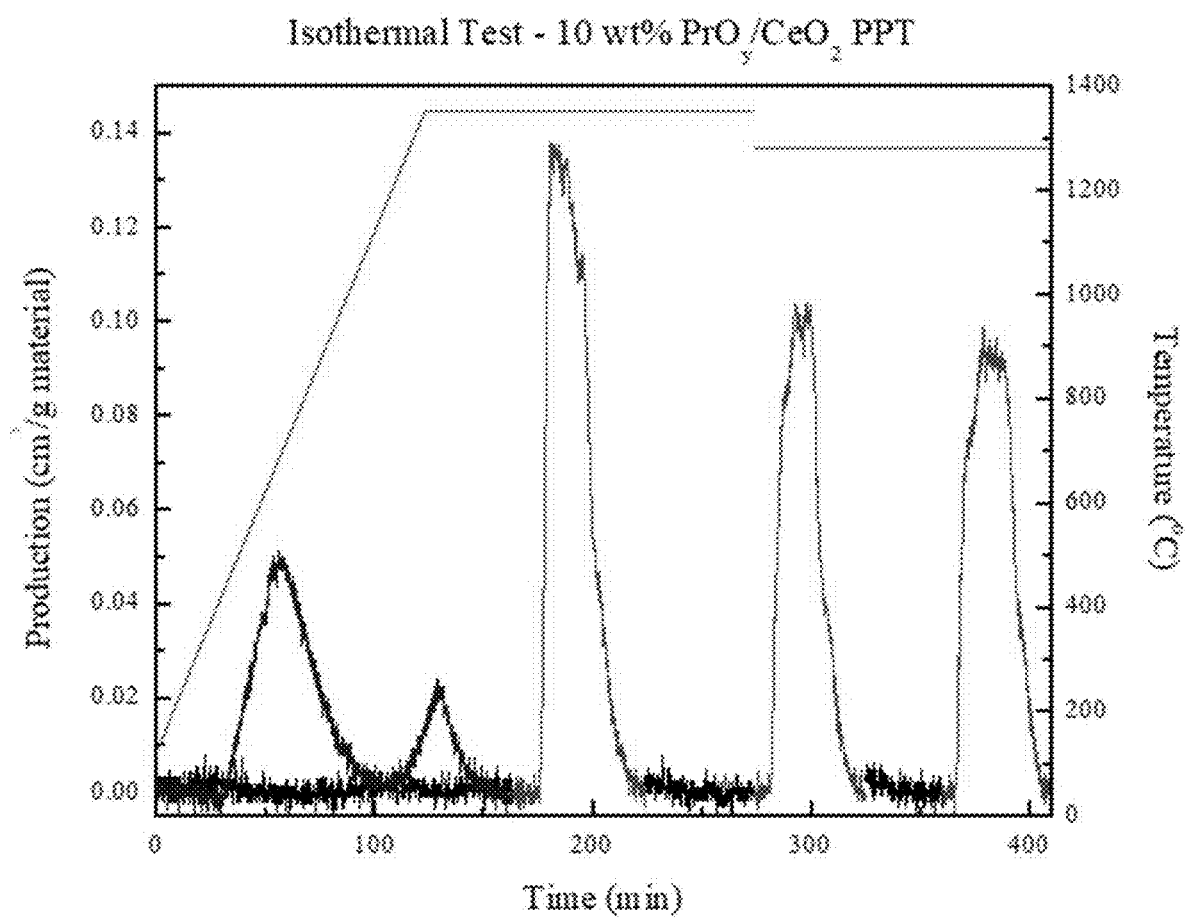
FIG. 2.2

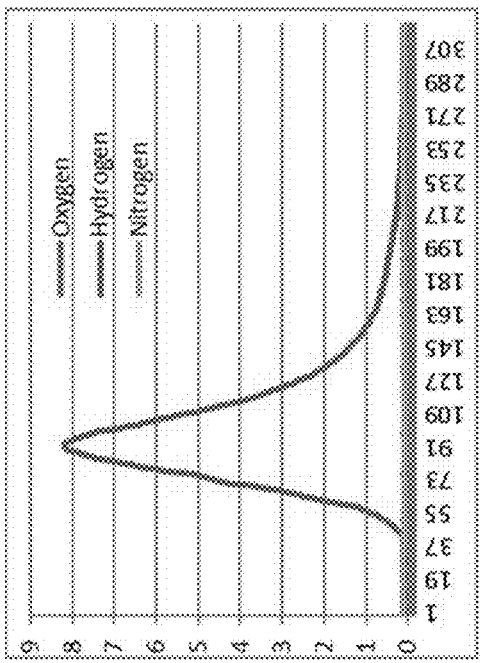
FIG. 2.3B
Water-Splitting. Water vapor is introduced and data collected at 1,000 °C.
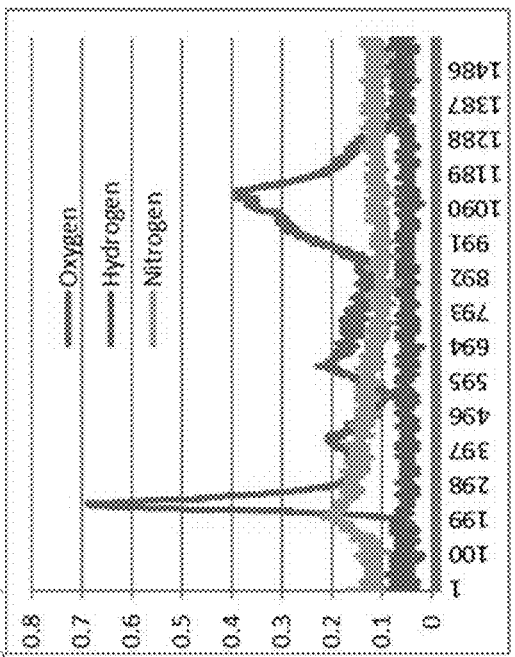
FIG. 2.3A
Activation or Regeneration. Collected during heating to and holding at 1,450 °C.

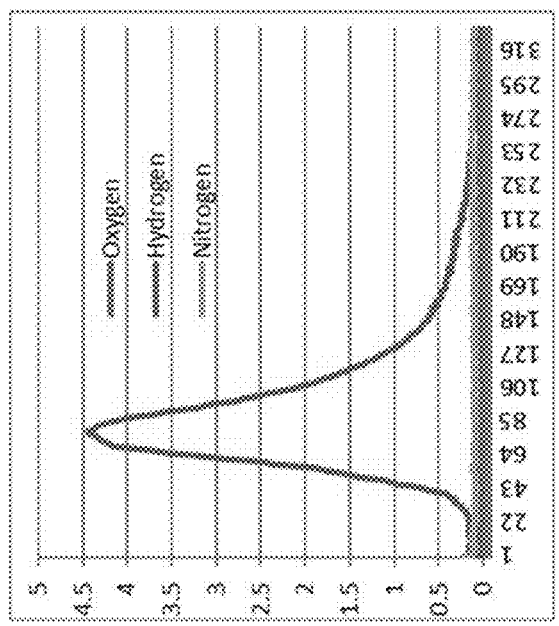
FIG. 2.3D
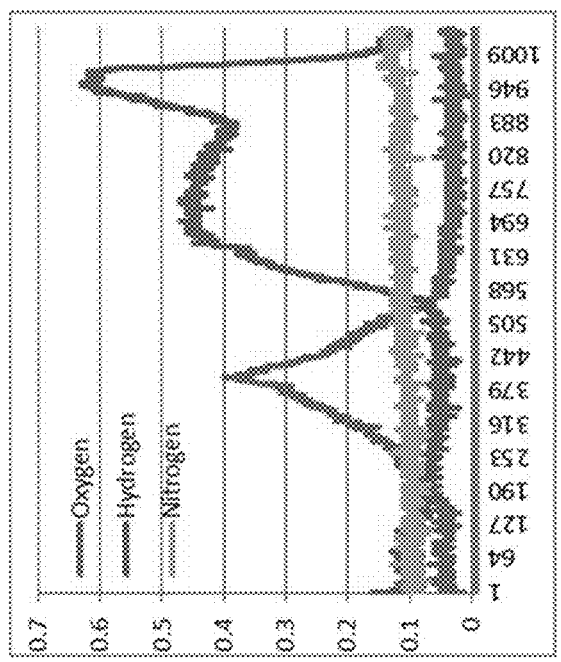
FIG. 2.3C

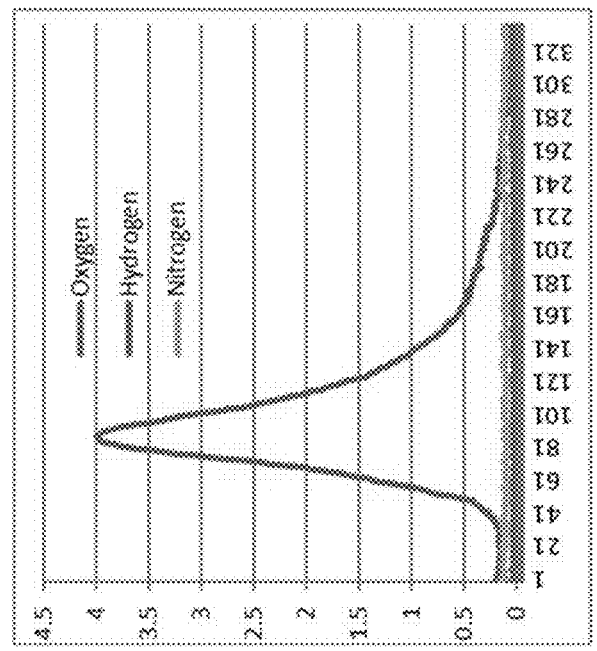
FIG. 2.3F
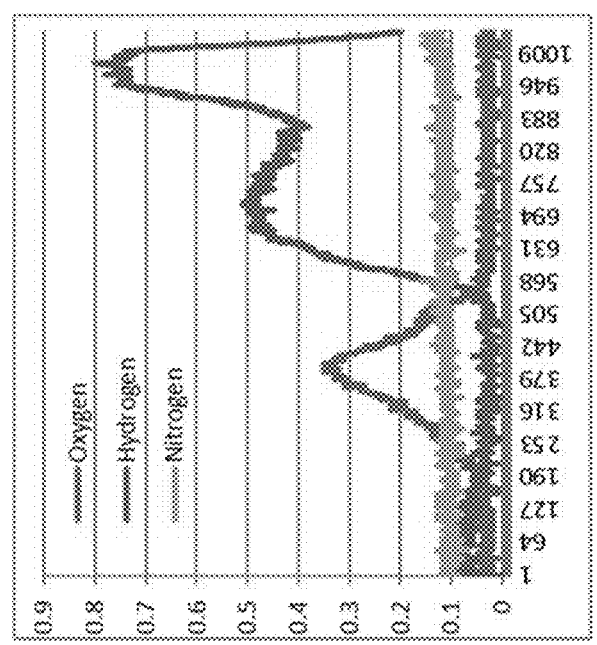
FIG. 2.3E

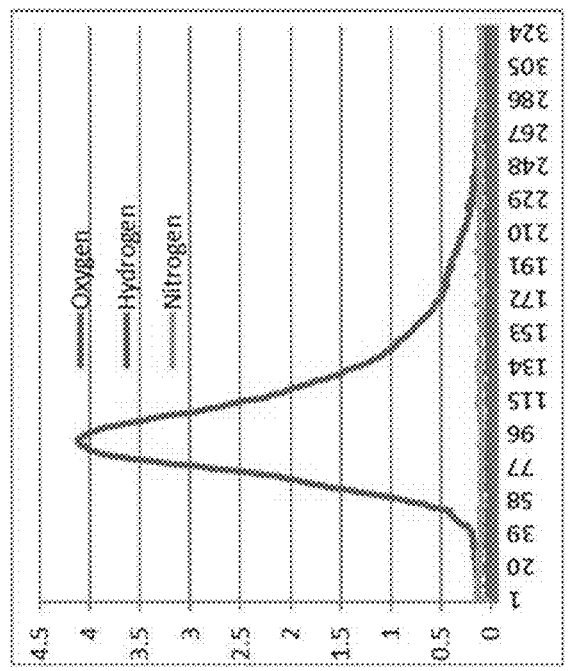
FIG. 2.3H
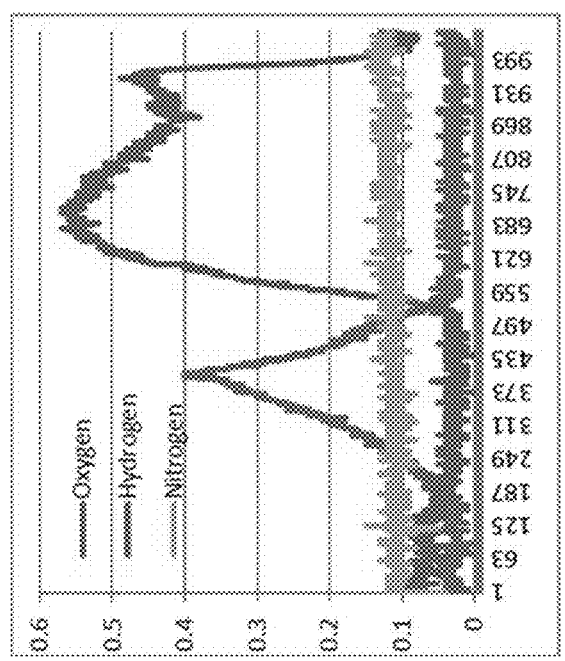
FIG. 2.3G

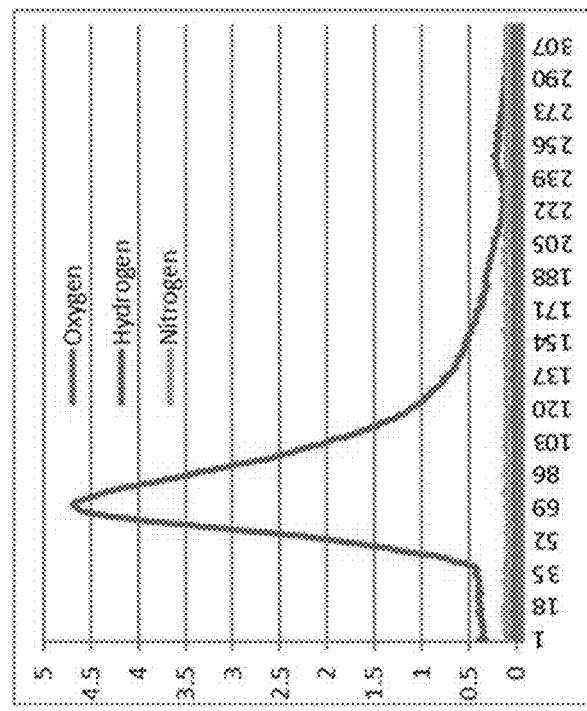
FIG. 2.3J
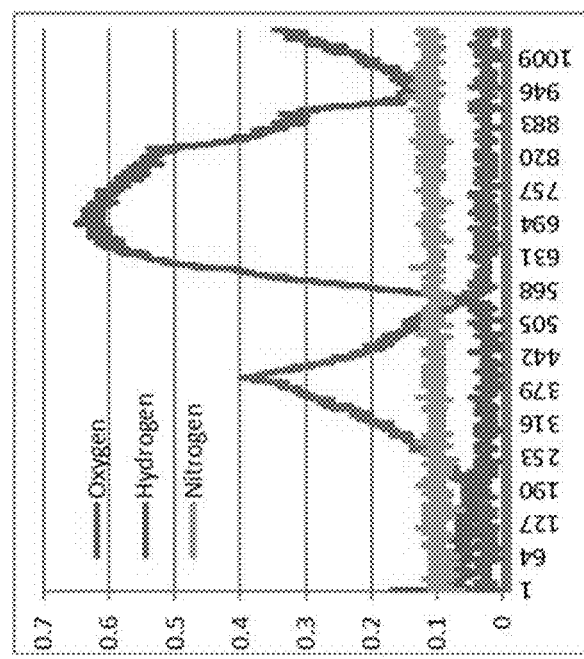
FIG. 2.3I

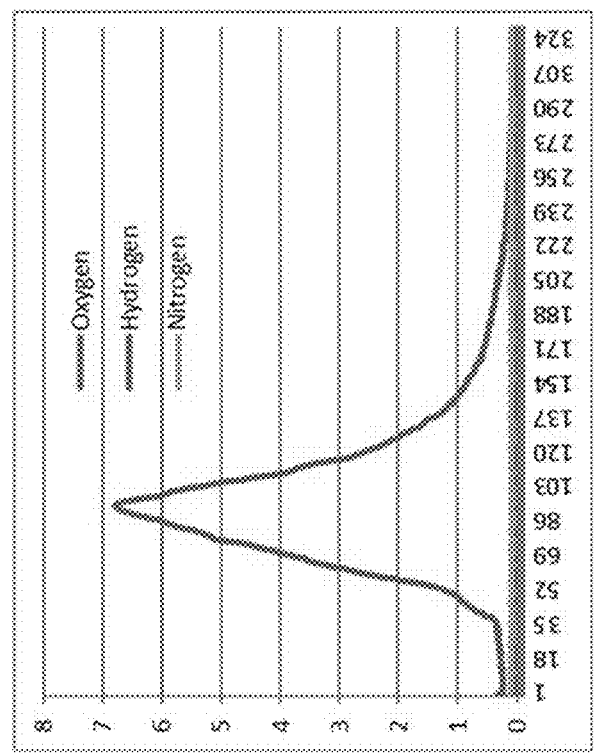
FIG. 2.3L
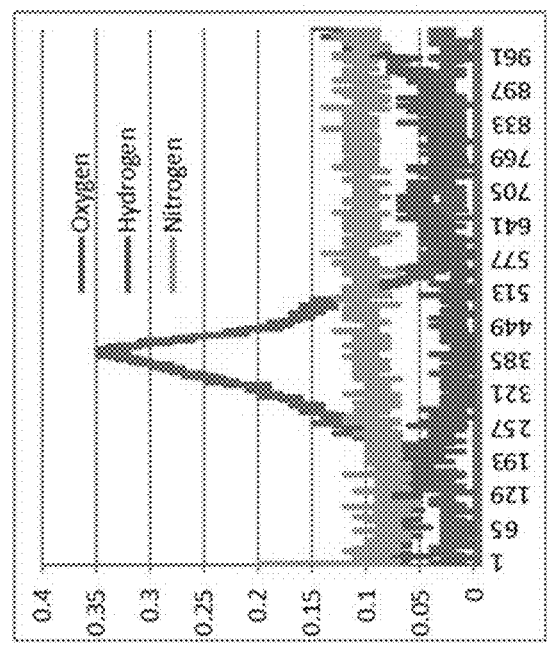
FIG. 2.3K

COMPOSITIONS, METHODS OF MAKING COMPOSITIONS, AND HYDROGEN PRODUCTION VIA THERMO-CHEMICAL SPLITTING

CROSS-REFERENCE TO RELATED APPLICATIONS

This application is a divisional application of and claims the benefit of and priority to U.S. Non-Provisional application Ser. No. 16/943,522 having the title "HYDROGEN PRODUCTION VIA THERMO-CHEMICAL WATER-SPLITTING," filed on Jul. 30, 2020, the disclosure of which is incorporated herein in by reference in its entirety.

U.S. Non-Provisional application Ser. No. 16/943,522 claims priority to the U.S. Provisional Application Serial No. 62/881,483 filed on Aug. 1, 2019, the disclosure of which is incorporated herein in by reference in its entirety.

STATEMENT REGARDING FEDERALLY SPONSORED RESEARCH OR DEVELOPMENT

This invention was made with government support under DE-AR0000184 awarded by the United States Department of Energy. The government has certain rights to the invention.

BACKGROUND

With the steady depletion of fossil fuel reserves and the environmental impacts of fossil fuels, it is necessary to consider alternative energy pathways. Solar energy is a renewable and widely available energy resource that can be concentrated to drive high-temperature thermochemical processes (1) (references shown in Example 1). Hydrogen ($H_2$) is a clean-burning fuel, but is currently produced from fossil fuels, i.e. methane or natural gas (2). Solar-driven thermo-chemical water-splitting to produce high-purity hydrogen offers an alternative renewable energy pathway and has received an increased interest in recent years (3-7). Solar-hydrogen can then be employed either directly as a fuel (in for example fuel cells) or in the production of liquid fuels (such as Fischer-Tropsch synthesis or in deoxygenation of biomass-derived chemicals) (8-11)].

While a very large number of thermochemical water-splitting cycles for the production of hydrogen has been reported (1, 12, 13), two-step metal oxide cycles are particularly promising (4, 14-18). Cerium dioxide (ceria or $CeO_2$) as a reactive water splitting material was first proposed by Otskuka et al. in 1985 (19) but it wasn't until two decades later, that ceria was first examined at lab-scales a potentially promising metal oxide for consistent hydrogen production (20). The two-step reaction system for ceria can be described by Equations (1) and (2).

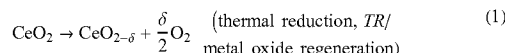
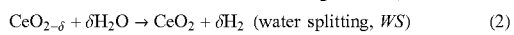

In the first thermal reduction step (TR) ceria is heated until oxygen is released. If this reaction goes to completion ($\delta$=0.5), $Ce^{+4}$ is completely reduced to $Ce^{+3}$ and $Ce_2O_3$ is formed. In the second exothermic water-splitting step (WS) the $CeO_{2-\delta}$ reacts with superheated steam to reform $CeO_2$ and hydrogen is released. When no more hydrogen is produced, the thermal reduction step is repeated to regenerate the oxygen deficient cerium oxide and the process can be repeated for multiple cycles. Since the thermal reduction to produce Ce2O3 requires very high temperatures, exceeding the melting points of Ce2O3, it is common to run ceria-based thermochemical water-splitting cycles under non-stoichiometric conditions, i.e. ($\delta$ <0.5). Therefore, typical values for $\delta$ when using thermal reduction temperatures of 1,500 C are significantly lower than that of the stoichiometric cycle. The value of $\delta$ is directly related to the maximum amount of $H_2$ produced in each cycle, and to the oxygen storage capacity of ceria (6). More specifically, $\delta$ is defined as the number of oxygen vacancies per mole of cerium that are formed due to the mobility of oxygen during the reduction step (Eq. 2), and is the dependent on the material structure and the conditions employed during the thermal reduction (in particular the temperature and $O_2$ pressure) (21). The advantage of the non-stoichiometric ceria cycle is that it can be operated at considerable lower maximum temperatures, such as 1500° C., compared to the stoichiometric $CeO_2$ cycle and direct water splitting without the use of a metal oxide (>2000° C.) (22). Furthermore, the use of a metal oxide cycle also allows efficient separation of hydrogen and oxygen since they are produced in different steps (14, 23-25).

Even under non-stoichiometric conditions, pure ceria has proven to be a very promising water splitting reactive material with reasonably high hydrogen production values (26-32) and long term stability (21,33). Some advantages of the ceria-based water splitting cycle include that the process is safe, clean, non-toxic and uses low-cost, abundant materials (20). Pure ceria has rapid oxidation kinetics (34) and can readily cycle between $CeO_2$ ($Ce^{+4}$) and $CeO_{2-\delta}$ ($Ce^{+4}$/$Ce^{+3}$) without undergoing structural phase transition (26, 35). $CeO_2$ also has a high melting point (2400° C.) and thus does not need any additional support material to alleviate severe sintering effects that can occur due to the high operating temperatures necessary for water splittingi However, thermodynamically, pure ceria has some drawbacks due to the high reduction temperatures required to achieve large extents of reduction: a theoretical reduction extent value of $\delta$=0.32 was found for conditions of 2000° C. and an oxygen partial pressure of $10^{-7}$ bar (21, 27). It was found also that in pure ceria, the reduction process is limited to the surface for most temperatures of interest (36). Therefore, research on ceria-based reactive materials for water-splitting have focused on dopant incorporation to increase the extent of reduction and promote reduction in the bulk of the materials (35-42). Particular focus has been devoted to Zr-doped $CeO_2$ materials as they can increase the hydrogen production and have faster kinetics during water splitting (47) compared to pure CeO2 These favorable characteristics for the Zr-doped system may be attributed to the improved resistance to sintering these materials exhibit (48).

Along with ceria, other reducible rare earth oxides (REOs), specifically terbium oxide (terbia, $TbO_x$) and praseodymium oxide (pradeodymia, $PrO_y$), commonly exist in both the +III and +IV oxidation states (1.5≤x,y≤2.0) allowing them to also have high oxygen mobility and favorable reduction properties (49-52). However, $TbO_x$ and $PrO_y$ are not active in the water-splitting step, and therefore they are commonly used with $CeO_2$ In the Tb-doped $CeO_2$ systems, the reducibility of ceria was shown to increase with Tb content (53), but $Tb_xCe_{1-x}O_2$ materials have to our knowledge only been tested in the $CO_2$ splitting reactions (54, 55). Pr-doped $CeO_2$ systems have also been proposed to be useful for low-temperature oxygen storage and show a lower reduction temperature than pure $CeO_2$ or Zr-doped $CeO_2$ (53, 56). A few $Pr_yCe_{1-x}O_2$ materials have been investigated in the thermochemical splitting of water or carbon dioxide (54, 55, 57-59). In addition, Pr and Tb have also been used as additional dopants in more complex mixed $CeO_2$-based oxides (44, 60-65). However, while Pr and Tb can to improve the reducibility $CeO_2$, they do not always improve the stability or the yields of the doped $CeO_2$ materials in water or carbon dioxide splitting reactions compared with pure or Zr-doped $CeO_2$ (54, 58, 63, 65).

SUMMARY

The present disclosure provides for compositions, methods of making compositions, and methods of using the composition. In an aspect, the present disclosure provides for a composition comprising: a crystalline compound having the formula $X_yCe_{1-y}O_2$, wherein y is from 0.01 to 0.15, wherein X is Pr or Tb, wherein the crystalline compound has an average crystalline size of about 20 to 30 nanometers as determined by X-ray diffraction (XRD) data using the Scherrer equation prior to thermochemical water splitting and about 40 to 50 nanometers after 6 cycles of thermochemical water splitting.

The present disclosure also provides for a method of making a crystalline compound having the formula $X_yCe_{1-y}O_2$ comprising: mixing $CeO_2$ nanoparticles in water to form a $CeO_2$ dispersion, wherein the $CeO_2$ nanoparticles have an average size of about 15 to 30 nm; mixing the $CeO_2$ dispersion with a nitrate of a rare earth element selected from praseodymium or terbium to form a second dispersion; precipitating the rare earth element as a hydroxide onto the $CeO_2$ nanoparticles to form modified $CeO_2$ nanoparticles; separating and drying the modified $CeO_2$ nanoparticles; and heating the modified $CeO_2$ nanoparticles to decompose the hydroxides to form a rare earth element oxide and to form the crystalline compound having the formula $X_yCe_{1-y}O_2$, wherein y is from 0.01 to 0.15, wherein X is Pr or Tb.

The present disclosure also provides for a method of splitting water, comprising: exposing water to a crystalline compound, in a reduced form, in the presence of an inert gas, wherein the crystalline compound has the formula $X_yCe_{1-y}O_2$, wherein y is from 0.01 to 0.15, wherein X is Pr or Tb; oxidizing the crystalline compound with the water to produce $H_2$, at a first temperature; and regenerating the crystalline compound during the step of reducing at a second temperature, wherein $O_2$ is released during regeneration and after $O_2$ is released, $H_2$ is released during regeneration, wherein the first temperature is about 1000 to 1450° C., wherein the second temperature is about 1000 to 1450° C.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1.1 illustrates hydrogen production as a function of thermochemical cycle for 1.0 and 10 wt % (synthesized via precipitation: PPT or incipient wetness impregnation, IWI) $TbO_x/CeO_2$ and undoped $CeO_2$ materials.

FIG. 1.2 illustrates hydrogen production as a function of thermochemical cycle for 1.0 and 10 wt % (PPT and IWI) $PrO_y/CeO_2$ and undoped $CeO_2$ materials.

FIG. 1.3 illustrates hydrogen production as a function of time and temperature for 10 wt % $PrO_y/CeO_2$ (PPT). The initial oxygen release profile is included. The hydrogen, oxygen and temperature are monitored and represented here in green, blue and red respectively.

FIG. 1.4 illustrates XRD spectra for fresh and spent $PrO_y/CeO_2$ materials.

FIG. 1.5 illustrates XRD spectra for fresh and spent $TbO_x/CeO_2$ materials.

FIG. 2.1 illustrates thermochemical water splitting cycle.

FIG. 2.2 illustrates oxygen release monitored during heating to the isothermal operating temperature (left hand side) and hydrogen production during isothermal operation at 1,350 and 1,280° C. (right hand side) over the $PrO_y/CeO_2$ material. Blue line: oxygen, green line: hydrogen. The red line shows the temperature ramp and the isothermal operation set point.

FIGS. 2.3A-2.3L are mass spectrometer data from typical cycles over a 10 wt % $PrO_y/CeO_2$ material synthesized via precipitation. Left panels (FIGS. 2.3A, 2.3C, 2.3E, 2.3G, 2.3I, 2.3K) are collected during heating to 1,450° C. when only He and Ar are flowing through the system (no water vapor is introduced). The red traces in the left panels of these graphs reveal the unusual behavior, as hydrogen is released when no water is introduced. Some materials will reveal a small peak during activation also, but this one does not. Each row represents one cycle (i.e. one activation or regeneration and one water-splitting step). After the fifth cycle, the hydrogen release in the left panel is very low.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the compositions, methods, and materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Discussion

Embodiments of the present disclosure provide for compositions, methods of making compositions, and methods of using the composition. In particular, the composition can be a reactive material that can be used to split a gas such as water or carbon dioxide. Embodiments of the composition are stable over multiple cycles (e.g., water splitting cycles) and produce as much or more products (e.g., $H_2$) relative to other similar less-stable reactive materials or catalysts.

Significant effort has been devoted to the development of $CeO_2$-based oxides for thermochemical water or carbon dioxide splitting, but only a few studies on the binary oxides of praseodymium (Pr) or Terbium (Tb) oxide with cerium dioxide ($CeO_2$) have been reported to date. The synthesis methods used herein versus the other methods are different from the one another and produce compounds that have unique structure and behavior, specifically during the water splitting cycle. Although not intending to be bound by theory, while some studies may appear similar, the unique results indicate a chemical and/or structural difference. This difference may be represented in the crystalline structure of the composition. The chemical composition can be represented by the formula $X_yCe_{1-y}O_2$, where y is from 0.01 to 0.15 or about 0.1, and where X is Pr or Tb. The crystalline structure of the compound has an average crystalline size of about 20 to 30 nanometers as determined by X-ray diffraction (XRD) data using the Scherrer equation prior to thermochemical water splitting and a crystalline structure of about 40 to 50 nanometers after 6 cycles of thermochemical water splitting, whereas other systems increase in crystal size by one or more magnitudes during the water splitting cycle, additional details regarding the XRD data and the Scherrer equation are provided in Example 1. The unique characteristic is the ability to produce hydrogen during the regeneration half cycle of the overall water-splitting cycle. The regeneration half cycle of these materials produce $O_2$ first and then produce Hz, which is not observed in other systems. The combination of the small change in crystal size during water splitting cycles in conjunction with producing $H_2$ after $O_2$ in the regeneration cycle are evidence that the compositions of the present disclosure are unique and different than similar systems. Based on the production of $H_2$ during regeneration, water and/or OH are retained by the composition at very high temperature (e.g., about 1000-1450° C.), which is not observed in other systems. It is specifically observed that the chemical composition is "wet" after use as compared to other compositions with are "dry" after use. It is noted that many descriptions of other systems are incomplete in the data presented and/or analysis, but if $H_2$ production during regeneration and/or the small size increase in crystal size were observed, they would have been reported.

In addition to water or carbon dioxide splitting, the compositions of the present disclosure have oxygen storage and redox properties that are beneficial in a number of catalytic applications or similar applications, such as in three-way reactive materials or catalyst, $NO_x$ traps, $N_2O$ decomposition, PROX (preferential CO oxidation), combustion of volatile organic compound and soot removal, as well as in solid oxide fuel cell applications. Other applications include energy storage and air separation.

As briefly mentioned above, the present disclosure provides for a crystalline compound having the formula $X_yCe_{1-y}O_2$, where y is from 0.01 to 0.15 or about 0.1 and X is Pr or Tb. The crystalline compound has an average crystallite size of about 20 to 30 nanometers as determined by X-ray diffraction (XRD) data using the Scherrer equation prior to thermochemical water splitting and about 40 to 50 nanometers after 6 cycles of thermochemical water splitting, as described in Example 1.

The crystalline compound can be made by mixing $CeO_2$ nanoparticles in deionized water to form a $CeO_2$ dispersion. The $CeO_2$ nanoparticles have an average size of about 15 to 30 and have a spherical or substantially spherical shape. The $CeO_2$ dispersion can be mixed with a nitrate of a rare earth element selected from praseodymium ($Pr(NO_3)_3$) or terbium (Tb(NO$_3$)$_3$) (or other Pr or Tb precursor material) to form a second dispersion. A precipitation can be made of the rare earth element as a hydroxide on the CeO$_2$ nanoparticles to form modified CeO$_2$ nanoparticles. The precipitation can be performed by adding sodium hydroxide dropwise to the second dispersion. Once the precipitation is complete, the modified CeO$_2$ nanoparticle precipitate can be removed from the solution and dried. Subsequently, the modified CeO2 nanoparticle precipitate can be heated (e.g., heated at about 800-1000° C. for 2 to 6 hours) to decompose the hydroxides to form a rare earth element oxide and to form the crystalline compound having the formula $X_y Ce_{1-y} O_2$. Additional details are provided in Examples 1 and 2.

Embodiments of the chemical composition can be used to split gas phase materials such as water (steam) and carbon dioxide. In an aspect, the gas splitting can be performed in under isothermal (e.g., 99.5-100% the same temperature) or substantially (e.g., about 90%, about 92.5%, about 95%, or about 99%) isothermal conditions. For example, the method of splitting of water can be performed in a reactor such as that provided in Example 1. The method can include exposing water to a crystalline compound (e.g., $X_y Ce_{1-y} O_2$), in a reduced form, in the presence of an inert gas (e.g., He, Ar). The crystalline compound can be oxidized with the water (e.g., steam) to produce H$_2$ at a first temperature (e.g., about 1000 to 1450° C.). Subsequently, the crystalline compound can be regenerated during reduction at a second temperature (e.g., about 1000 to 1450° C.). During regeneration, O$_2$ is released and after O$_2$ is released, H$_2$ is released, which is unique. The reduction and oxidizing steps can be performed under isothermal or substantially isothermal conditions, where the difference between the first temperature and the second temperature is less than 100° C. or 50° C. Additional details are provided in Examples 1 and 2.

In another example, the method of splitting of carbon dioxide can be performed in a reactor such as that provided in Example 1. The method can include exposing carbon dioxide to a crystalline compound (e.g., $X_y Ce_{1-y} O_2$), in a reduced form, in the presence of an inert gas (e.g., He, Ar). The crystalline compound can be oxidized with the carbon dioxide to produce CO at a first temperature (e.g., about 1000 to 1450° C.). Subsequently, the crystalline compound can be regenerated during reduction at a second temperature (e.g., about 1000 to 1450° C.). During regeneration O$_2$ is released. The reduction and oxidizing steps can be performed under isothermal or substantially isothermal conditions, where the difference between the first temperature and the second temperature is less than 100° C. or 50° C. Additional details are provided in Examples 1 and 2.

EXAMPLES

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

In this study, the potential for Tb-doped and Pr-doped CeO$_2$ to serve as reactive materials for hydrogen production via thermochemical water splitting was investigated. Due to the increased reduction properties seen for these REO-doped materials, the ability to produce hydrogen over repeated cycles was tested to examine the materials activity and stability. These materials were compared to pure CeO$_2$, and have also been compared with Zr-doped CeO$_2$ and transition metal (Fe) doped CeO$_2$ materials which are all well-known and successful water splitting materials (66).

Experimental Methods

Material Synthesis

The reactive materials were prepared via deposition of the dopant oxide onto ceria nanoparticles using previously reported synthesis techniques, namely precipitation (PPT) (66) or incipient wetness impregnation (IWI) (67). The ceria used for these materials was a commercially available nanoparticle powder supplied by Nanostructured & Amorphous Materials Inc.

In the precipitation method, an aqueous solution of the dopant metal nitrate precursor, either Pr(NO$_3$)$_3$.6H$_2$O (Aldrich, 99.99%) or Tb(NO$_3$)$_3$.H$_2$O (Alfa Aesar, 99.9%), was added to an aqueous dispersion of ceria. The dopant loading was either 1.0 or 10.0% metal dopant by weight (wt %) on the CeO$_2$ support. The resulting aqueous mixture was then titrated with a sodium hydroxide solution (NaOH (aq), prepared using NaOH from Sigma-Aldrich, 99.99% trace metals basis) until the pH of the mixture was in the range of 9-10, forming metal hydroxides on the support. The amount of NaOH titrated corresponded to a 100% excess based on the amount of metal nitrate precursor used. The resulting mixture was aged at room temperature overnight, filtered and rinsed with deionized water. This washing procedure was repeated and the resulting material was dried in air at 105° C. overnight. After drying, the material was calcined in air at 800° C. for 4 hours to obtain the final powder.

In the IWI method, the metal nitrate precursor was dissolved in a volume of deionized water equal to the pore volume of the ceria powder. The aqueous precursor solution was then added dropwise to the dry ceria powder under continuous stirring until incipient wetness was achieved. The resulting material was dried in air at 105° C. overnight. The dried material was then calcined in air at 800 ° C. for 4 hours to obtain the final powder. Before reaction experiments, the materials were pressed and pelletized using a Carver pellet press, before being crushed and sieved to a size range of 250-500 µm.

Reactor System

A reactor was designed and built to allow WS and TR steps to occur sequentially over multiple cycles. The reactor design has been described in detail previously (66). In summary, approximately 3 g of the sieved powder material was loaded into the reactor, a 0.95 cm (⅜") inner diameter (ID) [1.27 cm (½") outer diameter (OD)] alumina tube, and supported by quartz wool. The reactor was then placed inside of a separate 5.08 cm (2") OD alumina tube, which is part of a Carbolite STF 16/450 1,600° C. tube furnace, equipped with a programmable temperature controller. The temperature was measured using a thermocouple on the outside of the smaller reactor tube (inside the well-insulated furnace tube).

An inert gas mixture of helium and argon (1:1 mixture) at a total flow rate of 40 cm$^3$ min$^{-1}$ was passed over the reactive material inside the reactor system. In order to introduce steam to the system, a KDS series 101 syringe pump injected 0.3 mL/hour of deionized water into an evaporator (a MTI GSL-1100X tube furnace) held at 120° C. The steam was carried by the inert gases through heated lines to the reactor furnace. The reactor effluent passed through a condenser (ice bath) to cool the outlet gas mixture and remove most of the unreacted water before the product gases were analyzed by an on-line mass spectrometer (Hiden QGA Gas Analyzer). For each WS experiment, the contribution of water to the $H_2$ signal was evaluated and, although very small, subtracted from the analyzed mass spectrometry data for consistency and accuracy.

Hydrogen Production Experiments

The hydrogen production over the synthesized reactive materials was evaluated through a sequence of TR and WS steps. In a typical experiment, the reactive material was first activated by heating to 1450° C. until a complete oxygen desorption profile was obtained. The reactor furnace temperature was then decreased at a constant rate of 10° C./min to 1000° C. where the WS step was performed. For the WS step, generated steam was carried by the inert gas mixture and passed over the oxygen-deficient material until a complete hydrogen production profile was obtained. The reactor furnace temperature was then increased at a constant rate of 10° C./min to 1450° C. for the second TR step. Again, the material was held at 1450° C. until a complete oxygen release profile was obtained, before the temperature decreased to 1000° C. for the second WS step. These WS and TR cycles were repeated six times to determine the hydrogen production and oxygen evolution in each step to reveal material reactivity and stability over extended operation.

The most promising material was also tested for activity under isothermal operation, where both the TR and WS were operated at the same temperature. In these experiments, the initial material activation occurred by heating the material to 1350° C. The reactor furnace was then held at this temperature for the duration of the WS and TR steps, and the main difference between the WS and TR steps was the introduction of steam during the WS step. The hydrogen production is monitored until a complete profile was obtained at which time the steam was turned off and the material was held at 1350° C. for 45 minutes to represent the TR step. These steps were repeated three times to determine hydrogen production over the reactive material under isothermal conditions.

Material Characterization

All reactive materials were subjected to room temperature X-ray diffraction (XRD) on a Phillips X'Pert Powder X-ray diffractometer using Bragg-Brentano geometry with a Cu Kα radiation source (λ=0.154 nm). Reactive materials were secured onto a glass slide using double-sided tape prior to measurements. The Scherrer equation (Eq. 3) was used to calculate an average crystallite size. In the Scherrer equation, $d_p$ is the crystallite size in nm, K is the shape factor (taken as 0.9 here), λ is the source radiation wavelength, β is the peak width at half the maximum intensity, and θ is the Bragg angle in radians.

$$d_p = \frac{K\lambda}{\beta \cos \theta} \quad (3)$$

In order to evaluate any dopant incorporation into the $CeO_2$ lattice structure, unit cell volumes were calculated. A cubic $CeO_2$ unit cell reference of 158.08 Å$^3$ (JCPDS #: 98-015-5604) was used in order to determine if any expansion or contraction of the unit cell occurred due to dopant incorporation. The cubic lattice structure has the following relationship (Eq. 4) between crystal planar values (h, k and l), lattice axial distance (a) and the d-spacing (d) which can be found experimentally using the Bragg equation (Eq. 5).

$$\frac{1}{d^2} = \frac{h^2 + k^2 + l^2}{a^2} \quad (4)$$

$$n\lambda = 2d \sin \theta \quad (5)$$

Results and Discussion

The doped-$CeO_2$ materials were subjected to thermochemical water splitting cycles under various temperature conditions. Pure $CeO_2$ was also tested as a standard to compare with the doped materials. Doped-$CeO_2$ materials were tested not only for reactivity compared to $CeO_2$ but for optimization of other factors such as dopant loading (loadings were varied between 1 and 10 wt % for certain materials) and synthesis procedure (PPT vs. IWI). These materials were subjected to detailed material characterization before (fresh) and after (spent) water splitting cycles. The hydrogen production results for all materials tested at a TR temperature of 1450° C. and a WS temperature of 1000° C. are reported in Table 1.

TABLE 1

Hydrogen production over doped $CeO_2$ materials.

| Material Description | Dopant [wt %] | Synthesis Method | $H_2$ Production [cm$^3$/g material] | | |
|---|---|---|---|---|---|
| | | | Average | Cycle 1 | Cycle 6 |
| $CeO_2$ | | | 5.49 | 6.06 | 5.18 |
| $PrO_y/CeO_2$ | 1 | PPT | 5.99 | 6.52 | 5.95 |
| | 10 | PPT | 6.02 | 6.07 | 5.57 |
| | 10 | IWI | 5.61 | 3.95 | 6.13 |
| $TbO_x/CeO_2$ | 1 | PPT | 5.94 | 6.74 | 5.79 |
| | 10 | PPT | 4.70 | 5.16 | 4.28 |
| | 10 | IWI | 4.81 | 5.26 | 4.59 |

The rare earth oxides (REOs), praseodymia ($PrO_y$) and terbia ($TbO_x$), are reducible with stable +III and +IV oxidation states ($Pr_2O_3/PrO_2$, $Tb_2O_3/TbO_2$), similar to $CeO_2$. Therefore, adding these REOs to $CeO_2$ has potential to increase the oxygen mobility in the CeO2 lattice. In addition to investigating concentrations of REOs added (1.0 and 10 wt %) two synthesis methods were also evaluated, the precipitation (PPT) method, and an incipient wetness impregnation (IWI) method (66). The hydrogen production over the $TbO_x/CeO_2$ and $PrO_y/CeO_2$ plus pure $CeO_2$ materials are shown in FIGS. 1.1 and 1.2 respectively.

Adding 1.0 wt % of Tb to $CeO_2$ resulted in a slightly improved hydrogen production, and a material that exhibited a behavior very close to that of pure $CeO_2$, i.e. a slight decrease in hydrogen production after the first cycle and then a fairly stable hydrogen production during each subsequent cycle. It is difficult to determine from the data in FIG. 1.1 if the 1.0-$TbO_x/CeO_2$ material is less stable compared with pure $CeO_2$, since the slightly lower hydrogen produced during cycle five is due to the furnace not quite reaching 1450° C. However, the improvement in hydrogen production over undoped $CeO_2$ is also small, as might be expected due to the low loading of Tb (1.0 wt %).

Increasing the Tb content to 10 wt % resulted in a lower average hydrogen production per cycle and a material that appears to be less stable compared with pure $CeO_2$ The $TbO_x/CeO_2$ material synthesized using the incipient wetness impregnation (10-$TbO_x/CeO_2$-IWI), appears more stable compared with the 10-$TbO_x/CeO_2$-PPT material, although the differences between the materials are not statistically significant.

Similar to the results for the 1.0-$TbO_x/CeO_2$ material, the 1.0-$PrO_y/CeO_2$ material increased the hydrogen production per cycle. A 1.0 wt % loading of Pr appears to give a little more consistent improvement compared with 1.0 wt % Tb. Again, the lower hydrogen yield during cycle number five is due to a lower maximum temperature during the TR step as a result of our aging furnace. Increasing the Pr content to 10 wt % results in a higher hydrogen production compared with that obtained from pure $CeO_2$, regardless of synthesis method. Compared with the 1.0-$PrO_y/CeO_2$ material, the hydrogen yields per cycle appear less consistent for the two 10-$PrO_y/CeO_2$ materials. Furthermore, while most materials in this study produce the largest hydrogen yield in the first water-splitting cycle, this is not the case for the two 10-$PrO_y/CeO_2$ materials. It appears that they undergo a beneficial restructuring during the first two water-splitting cycles, which results in more active materials. Once activated, the 10-$PrO_y/CeO_2$-IWI is very stable and produces a high and consistent hydrogen yield. In fact, out of the materials investigated in this study, the 10-$PrO_y/CeO_2$-IWI material produces the largest amount of hydrogen during cycle number six. In contrast, the 10-$PrO_y/CeO_2$-PPT material appears to lose some activity after the first three cycles, although part of the reason for the lower yields during cycles 4-6 is the furnace not quite reaching 1450° C. during the TR step. Therefore, of the materials included in the study, the Pr-doped $CeO_2$ nanoparticles are the most promising water-splitting materials. Isothermal test on $PrO_y/CeO_2$ material During the water splitting cycles over the $PrO_y/CeO_2$ materials, a very unique behavior was observed. During each TR step, these materials would produce some hydrogen immediately following the completed oxygen release profile while the system was held at 1450° C. This was consistent for all dopant loadings and synthesis methods for each TR step in each cycle after the initial thermal activation. More hydrogen was then released when steam was introduced at the water-splitting temperature (1000° C.). It was also observed that these $PrO_y/CeO_2$ materials, in contrast to all other materials investigated, were not dry when removed from the reactor after completion of the water splitting experiments, i.e. after the last water-splitting step where the steam was turned off (at 1000° C.) and the reactor was cooled down to room temperature under a flow of inert. This suggests that the unique $PrO_y$—$CeO_2$ material is able to retain water in some form after the WS step and hydrogen is not released until oxygen is released from the material, which occurs at much higher temperatures. This further indicates that isothermal operation, where both the thermal reduction and the water-splitting reaction are operated at the same temperature, should be effective over this material. Isothermal operation is desirable to reduce the energy losses associated with heating and cooling when the TR and WS steps are operated at different temperatures.

The 10 wt % $PrO_y/CeO_2$ PPT material was chosen for this experiment, and 1350° C. was chosen as the operating temperature for both TR and WS. This is lower than the typical 1450° C. TR step and higher than commonly used WS temperatures (1000-1200° C.). Once the $O_2$ evolution was complete at 1350° C. (FIG. 1.3), steam was introduced at this temperature. Despite the non-optimal water-splitting temperature, hydrogen evolution is evident and 2.99 cm³/g material of hydrogen was produced. When the hydrogen evolution is complete, the steam is turned off and the system is flushed with inert. Unfortunately, due to the age of the heating elements in the tube furnace, the system was unable to hold the temperature at 1350° C., and after the first cycle the temperature had dropped to approximately 1280° C. However, even at this lower temperature (which is non-optimal for thermal reduction), the 10 wt % $PrO_y/CeO_2$ material produced 2.13 and 2.36 cm³/g material of hydrogen for the second and third WS cycle respectively. This is higher than the hydrogen production over a $FeO_z/CeO_2$ material under normal operating conditions (66).

XRD Analysis

XRD patterns were collected for all fresh and spent materials for all dopant loading percentages and synthesis method. The informative regions in the XRD patterns obtained from the $PrO_y/CeO_2$ and $TbO_x/CeO_2$ materials are shown in FIGS. 1.4 and 1.5. The figures clearly reveal that the main $CeO_2$ phase present is the cubic phase. Both the fresh and spent spectra show a predominance of one cubic phase indicated that solid solutions or amorphous additions have been formed between the dopant and the $CeO_2$ nanopowder. The calculated particle sizes from the Scherrer equation as well as the calculated unit cell volumes are presented in Table 2. The crystallite sizes are consistent with the trends that are event in the XRD patterns. Comparing all of the fresh materials, the crystallite size falls within a 16-30 nm range with no distinct trend in particle size relating to dopant loading percentage or synthesis method. After water splitting cycles, the crystallite size increased and in most cases falls within a 40-56 nm range (the 10 wt % $PrO_y/CeO_2$ IWI being an outlier with a crystallite size of 26 nm) which is consistent with the narrower peaks seen in the spent materials compared to the fresh (FIGS. 1.4 and 1.5).

TABLE 2

| Material Description | Dopant wt % | Synthesis Method | Crystallite Size (nm) | | Unit Cell Volume (Å³) | |
|---|---|---|---|---|---|---|
| | | | Fresh | Spent | Fresh | Spent |
| $CeO_2$ | | | 22.7 | 44.5 | 156.3 | 154.8 |
| $PrO_y/CeO_2$ | 1 | PPT | 20.8 | 52.2 | 156.8 | 157.9 |
| | 10 | PPT | 24.6 | 40.6 | 156.9 | 158.3 |
| | 10 | IW1 | 24.7 | 25.6 | 157.0 | 156.3 |
| $TbO_x/CeO_2$ | 1 | PPT | 28.1 | 46.6 | 157.0 | 155.8 |
| | 10 | PPT | 24.2 | 41.2 | 156.2 | 155.8 |
| | 10 | IW1 | 27.1 | 46.7 | 156.8 | 157.8 |

After water splitting cycles, a distinct shoulder can be observed next to the $CeO_2$ peak which has been identified as cubic $PrO_2$ (JCPDS #:98-005-3996) for the $PrO_y/CeO_2$ materials (FIG. 1.4) and cubic $Tb_2O_3$ (JCPDS #: 98-002-7995) for the $TbO_x/CeO_2$ materials (FIG. 1.5). These materials have not been previously examined and cannot be directly compared but this second oxide phase was not seen for either the Zr-doped or Fe-doped (not shown) materials. The REO-doped materials exhibit higher hydrogen production values than the pure $CeO_2$ material. The existence of this secondary dopant oxide phase may improve the reduction and oxidation properties of the material and allow for higher oxygen mobility and therefore higher hydrogen production.

For the $PrO_y/CeO_2$ materials synthesized via PPT, a unit cell volume expansion occurred after water splitting cycles were performed. For the 1 wt % $PrO_y/CeO_2$ material, the unit cell volume increased from 156.8 $Å^3$ to 157.9 $Å^3$, while the 10 wt % $PrO_y/CeO_2$ material unit cell volume increased from 156.9 $Å^3$ to 158.3 $Å^3$ (Table 2). If the mixture of praseodymium cations in the system are both 3+ and 4+, the results indicate that $Pr^{3+}$ (1.27 Å) may have become incorporated into the $CeO_2$ lattice while $Pr^{4+}$ (1.10 Å) exists in the $PrO_2$ phase identified. The 10 wt % $PrO_y/CeO_2$ material synthesized via IWI follows the opposite trend where unit cell volume decreased slightly from 157.0 $Å^3$ to 156.3 $Å^3$ which may be due to some $Pr^{4+}$ incorporation since it is smaller than the host $Ce^{4+}$ material or it may be due to some crystallite material strain which would also increase the 2θ peak position value. We see this effect of crystallite strain on the 2θ peak position with the pure $CeO_2$ nanopowder as there was a unit cell contraction for that material between fresh and spent which cannot be attributed to any particular dopant.

A similar relationship was seen in the $TbO_x/CeO_2$ materials. For the $TbO_x/CeO_2$ materials synthesized via PPT, a unit cell volume contraction occurred after water splitting cycles were performed. For the 1 wt % $TbO_x/CeO_2$ material, the unit cell volume decreased from 157.0 $Å^3$ to 155.8 $Å^3$, while the 10 wt % $TbO_x/CeO_2$ material unit cell volume increases from 156.2 $Å^3$ to 155.8 $Å^3$. Again the 10 wt % $TbO_x/CeO_2$ material synthesized via IWI exhibited an opposite trend where the unit cell expanded from 156.8 $Å^3$ to 157.8 $Å^3$ (Table 2). As with the Pr-doped materials synthesized via PPT, the presence of the $Tb_2O_3$ phase may indicate that the $Tb^{3+}$ cations present will crystallize in the indicated oxide phase while the $Tb^{4+}$ cations (1.02 Å) may incorporate into the unit cell volume and cause the cell volume to contract. The $Tb^{3+}$ cation (1.18 Å) is larger than the $Ce^{4+}$ cation which may account for some of the unit cell expansion seen in the IWI material.

Conclusion

Doping $CeO_2$ with rare earth oxides, such as Pr and Tb, increased the average hydrogen production compared to pure $CeO_2$. Tb-doped materials showed a decrease in overall hydrogen production as Tb loading increased but the average production was still within a similar range to that of pure $CeO_2$. Pr-doping resulted in higher hydrogen production for all dopant loadings compared to pure $CeO_2$. Both Tb- and Pr-doped materials exhibited consistent hydrogen production and stability throughout six cycles. Comparing synthesis methods, 10 wt % materials prepared via incipient wetness impregnation showed similar hydrogen production to their counterpart materials prepared via precipitation. The IWI materials had less variation between hydrogen production per cycle indicating that this synthesis method may contribute to a higher material stability without loss in activity.

The Pr-doped materials exhibited unique water splitting abilities compared to any other material. For all of the dopant loadings and synthesis methods tested with these materials, hydrogen production began immediately following oxygen release during the thermal reduction step at elevated temperatures.

This led to investigating these materials experimentally under isothermal water splitting conditions. The 10 wt % $PrO_y/CeO_2$ material was tested and exhibited hydrogen production consistently at 1350 °C. Although the average hydrogen production of this material was low (2.49 $cm^3$/g of material), this material shows a lot of promise for future isothermal tests.

After XRD analysis was performed for all of the materials, there does not seem to be a strong correlation between dopant incorporation in the unit cell volume and high hydrogen production. The REO-doped materials have a second oxide phase present along with the cubic fluorite $CeO_2$. The Pr-doped materials show the presence of $PrO_2$ and the Tb-doped materials show the presence of $Tb_2O_3$ after water splitting. The addition of a second oxide phase may enhance the reduction and oxidation properties and therefore the oxygen mobility in the material. Theoretically, an increased oxygen mobility can lead to higher water splitting activity which we see for the REO-doped materials.

References for Background and Example 1

1 C. Perkins, A. W. Weimer, Solar-Thermal Production of Renewable Hydrogen, AIChE J. 55 (2009) 286-293.
2 S. Abanades, P. Charvin, G. Flamant, P. Neveu, Screening of water-splitting thermochemical cycles potentially attractive for hydrogen production by concentrated solar energy, Energy 31 (2006) 2805-2822.
3 Rosen M. Advances in hydrogen production by thermochemical water decomposition: a review. Energy 2010; 35:1068-1076.
4 Muhich C. L, Ehrhart B D, Al-Shankiti I, Ward B J, Musgrave C B Weimer A W. A review and perspective of efficient hydrogen generation via solar thermal water splitting. WIREs Energy Environ 2016; 5:261-287.
5 Roeb M, Neises M, Monnerie N, Call F, Simon H, Sattler C, Schmuker M, Pitz-Paal R. Materials-related aspects of thermochemical water and carbon dioxide splitting: a review. Materials 2012; 5:2015-2054.
6 Scheffe J R, Steinfeld A. Oxygen exchange materials for solar thermochemical splitting of $H_2O$ and $CO_2$: a review. Mater Today 2014; 17:341-348.
7 Xiao L, Wu S-Y, Li Y-R. Advances in solar hydrogen production via two-step water-splitting thermochemical cycles based on metal redox reactions. Renew Energy 2012; 41:1-12.
8 Andrews J, Shabani B. Re-envisioning the role of hydrogen in a sustainable energy economy. Int J Hydrogen Energy 2012; 37:1184-1203.
9 Kreuer K D. On the development of proton conducting polymer membranes for hydrogen and methanol fuel cells. J Membr Sci 2001; 185:29-39.
10 Hoffman P. Tomorrow's energy: hydrogen, fuel cells, and the prospects for a cleaner planet. 1st ed. Massachusetts: The MIT Press; 2012.
11 Trimm D L, Ilsen Onsan, Z. Onboard fuel conversion for hydrogen-fuel-cell-driven vehicles. Catal Rev: Sci Eng 2001;43:31-84.
12 M. Roeb, M. Neises, N. Monnerie, F. Call, H. Simon, C. Sattler, M. Schmücker, R. Pitz-Paal, Materials-Related Aspects of Thermochemical Water and Carbon Dioxide Splitting: A Review, Materials 2012, 5(11), 2015-2054. doi:10.3390/ma5112015
13 S. Abanades, P. Charvin, G. Flamant, P. Neveu, Screening of water-splitting thermochemical cycles potentially attractive for hydrogen production by concentrated solar energy, Energy 31 (2006) 2805-2822.
14 Miller J, Allendorf M, Diver R, Evans L, Siegel N, Stuecker J. Metal oxide composites and structures for ultra-high temperature solar thermochemical cycles. J Mater Sci 2008; 43:4714-4728.
15. Y. Mao, Y. Gao, W. Dong, H. Wu, Z. Song, X. Zhao, J .Sun, W. Wang, Hydrogen production via a two-step water splitting thermochemical cycle based on metal oxide - A review, Appl. Energy 267, 2020, 114860 (17 pp). https://doi.org/10.1016/j.apenergy.2020.114860
16. C. Agrafiotis, M. Roeb, C. Sattler, A review on solar thermal syngas production via redox pair-based water/carbon dioxide splitting thermochemical cycles, Renew. Sustain. Energy Rev. 42 (2015) 254-285. http://dx.doi.org/10.1016/j.rser.2014.09.039.
17. B. Bulfin J. Vieten, C. Agrafiotis, M. Roeb, C. Sattler, Applications and limitations of two step metal oxide thermochemical redox cycles; a review, J. Mater. Chem. A 5 (2017) 18951-18966. DOI: 10.1039/c7ta05025a.
18. R. J. Carrillo, J. R. Scheffe, Advances and trends in redox materials for solar thermochemical fuel production, Solar Energy 156 (2017) 3-20. http://dx.doi.org/10.1016/j.solener.2017.05.032
19. Otsuka K, Hatano M, Morikawa A. Decomposition of water by cerium oxide of δ-phase. Inorg Chim Acta 1985; 109:193-197.
20. Abanades S, Flamant G. Thermochemical hydrogen production from a two-step solar-driven water-splitting cycle based on cerium oxides. Sol Energy 2006; 80:1611-1623.
21. Rhodes N R, Bobek M M, Allen K M, Hahn D W. Investigation of long term reactive stability of ceria for use in solar thermochemical cycles. Energy 2015; 89:924-931.
22. M. Kubicek, A. H. Bork, J. L. M. Rupp, Perovskite oxides—a review on a versatile material class for solar-to-fuel conversion processes, J. Mater. Chem. A 5 (2017) 11983-12000. DOI: 10.1039/c7ta00987a
23. Funk J. Thermochemical hydrogen production: past and present. Int J Hydrogen Energy 2001; 26:185-90.
24. Ihara S. Feasibility of hydrogen production by direct water splitting at high temperature. Int J Hydrogen Energy 1978; 3:287-296.
25. Vishnevetsky I, Berman A, Epstein M. Features of solar thermochemical redox cycles for hydrogen production from water as a function of reactants' main characteristics. Int J Hydrogen Energy 2011;36:2817-2830.
26. Gokon N, Sagawa S, Kodama T. Comparative study of activity of cerium oxide at thermal reduction temperatures of 1300-1550° C. for solar thermochemical two-step water-splitting cycle. Int J Hydrogen Energy 2013; 38:14402-14414.
27. Abanades S, Legal A, Cordier A, Peraudeau G, Flamant G, Julbe A. Investigation of reactive cerium-based oxides for $H_2$ production by thermochemical two-step water-splitting. J Mater Sci 2010; 45:4163-4173.
28. Le Gal A, Abanades S, Flamant G. $CO_2$ and $H_2O$ splitting for thermochemical production of solar fuels using non-stoichiometric ceria and ceria/zirconia solid solutions. Energy Fuels 2011; 25:4836-4845.
29. Furler P, Scheffe J, Gorbar M, Moes L, Vogt U, Steinfeld A. Solar thermochemical $CO_2$ splitting utilizing a reticulated porous ceria redox system. Energy Fuels 2012; 26:7051-7059.
30. Chueh W, Falter C, Abbot M, Scipio D, Furler P, Haile S, Steinfeld A. High-flux solar-driven thermochemical dissociation of $CO_2$ and $H_2O$ using nonstoichiometric ceria. Science 2010; 330:1797-1801.
31. Kaneko H, Tamaura Y. Reactivity and XAFS study on $(1-x)CeO_2-xNiO$ (x=0.025–0.3) system in the two-step water-splitting reaction for solar $H_2$ production.
32. Cho H S, Gokon N, Kodama T, Kang Y H, Lee H J. Imrpoved operation of solar reactor for two-step water-splitting $H_2$ production by ceria-coated foam device. Int J Hydrogen Energy 2015; 40:114-124.
33. Chueh W, Haille S. A thermochemical study of ceria: exploiting an old material for new modes of energy conversion and $CO_2$ migration. Phil Trans R Soc A 2010; 368:3269-3294.
34. M. Roeb, N. Monnerie, A. Houaijia, D. Thomey, C. Sattler, Solar Thermal Water Splitting. In: Renewable Hydrogen Technologies: Production, Purification, Storage, Applications and Safety. Elsevier (2013) p. 63.
35. Balducci G, Kašpar J, Fornasiero P, Graziani M, Islam M S, Gale J D. Computer simulation studies of bulk reduction and oxygen migration in $CeO_2$—$ZrO_2$ solid solutions. J. Phys. Chem. B 1997; 101:1750-1753.
36. Fornasiero P, Balducci G, Di Monte R, Kašpar J, Sergo V, Gubitosa G, Ferrero A, Graziani M. Modification of the redox behavior of $CeO_2$ induced by structural doping with $ZrO_2$. J Catal 1996:164; 173-183.
37. G. Takalkar, R. R. Bhosale, S. Rashid, F. AlMomani, R. A. Shakoor, A. Al Ashraf, Application of Li-, Mg-, Ba-, Sr-, Ca-, and Sn-doped ceria for solar-driven thermochemical conversion of carbon dioxide, J Mater Sci (2020) 55:11797-11807. https://doi.org/10.1007/s10853-020-04875-1
38. R. R. Bhosale, G. Takalkar, P. Sutar, A. Kumar, F. AlMomani, M. Khraisheh, A decade of ceria based solar thermochemical H2O/CO2 splitting cycle, Int. J. Hydrogen Energy 44 (2019) 34-60. https://doi.org/10.1016/j.ijhydene.2018.04.080.
39. Y. Lu, L. Zhu, C. Agrafiotis, J. Vieten, M. Roeb, C. Sattler, Solar fuels production: Two-step thermochemical cycles with cerium-based oxides, Prog. Energy Comb. Sci. 75 (2019) 100785 (49 pp). https://doi.org/10.1016/j.pecs.2019.100785 0360-1285
40. A. Haeussler, S. Abanades, J. Jouannaux, M. Drobek, A. Ayral, A. Julbe, Recent progress on ceria doping and shaping strategies for solar thermochemical water and CO2 splitting cycles, AIMS Materials Science, 6(5) (2019) 657-684. DOI: 10.3934/matersci.2019.5.657.
41. G. D. Takalkar, R. R. Bhosale, A. Kumar, F. AlMomani, M. Khraisheh, R. A. Shakoor, R. B. Gupta, Transition metal doped ceria for solar thermochemical fuel production, Solar Energy 172 (2018) 204-211. https://doi.org/10.1016/j.solener.2018.03.022.
42. F. Call, M. Roeb, M. Schmücker, C. Sattler, R. Pitz-Paal, Ceria Doped with Zirconium and Lanthanide Oxides to Enhance Solar Thermochemical Production of Fuels, J. Phys. Chem. C 119 (2015) 6929-6938. http://dx.doi.org/10.1021/jp508959y.
43. Le Gal A, Abanades S. Catalytic investigation of ceria-zirconia solid solutions for solar hydrogen production. Int J Hydrogen Energy 2011; 36:4739-4748.
44. Le Gal A, Abanades S, Bion N, Le Mercier T, Harle V. Reactivity of doped ceria-based mixed oxides for solar thermochemical hydrogen generation via two-step water-splitting cycles. Energy Fuels 2013; 27:6068-6078.
45. Hao Y, Yang C-K, Haile S M. Ceria-zirconia solid solutions $(Ce_{1-x}Zr_xO_{2-\delta}, x\leq0.2)$ for solar thermochemical water splitting: a thermodynamic study. Chem Mater 2014; 26:6073-6082.

46 Le Gal A, Abanades S. Dopant incorporation in ceria for enhanced water-splitting activity during solar thermochemical hydrogen generation. J Phys Chem C 2012; 116:13516-13523.

47 Petkovich N D, Rudisill S G, Venstrom L J, Boman D B, Davidson J H, Stein A. Control of heterogeneity in nanostructured $Ce_{1-z}Zr_xO_2$ binary oxides for enhanced thermal stability and water splitting activity. J Phys Chem C 2011; 115:21022-21033.

48 Colon G, Valdivieso F, Pijolat M, Baker R T, Calvino J J, Bernal S. Textural and phase stability of $Ce_xZr_{1-x}O_2$ mixed oxides under high temperature oxidizing conditions. Catal Today 1999; 50:271-284.

49 S. R. Bishop, T. S. Stefanik and H. L. Tuller, Defects and transport in $Pr_xCe_{1-x}O_{2-l}$: composition trends, J Mater Res, 27 (2012), pp. 2009-2016. https://doi.org/10.1557/jmr.2012.130.

50 Gruen D M, Koehler W C, Katz J J. Higher oxides of the lanthanide elements. Terbium dioxide. J Am Chem Soc 1951; 73:1475-1479.

51 Hyde B G, Bevan D J M, Eyring L, On the praseodymium+oxygen system. Phil Trans R Soc Lond A 1966; 259:583-614.

52 Antoshin G, Minachev K, Dmitriev R. Kinetics of isotope exchange in cerium dioxide-oxygen systems. Russ J Phys Chem 1967; 41:1587

53 Zhou G, Gorte R. Thermodynamic investigation of the redox properties for ceria-hafnia, ceria-terbia, and ceria-praseodymia solid solutions. J Phys Chem B 2008; 112: 9869-9875.

54 R. Jacot, R. Moré, R. Michalsky, A. Steinfeld, G. R. Patzke, Trends in the phase stability and thermochemical oxygen exchange of ceria doped with potentially tetravalent metals, J. Mater. Chem. A 5 (2017) 19901-19913. https://doi.org/10.1039/C7TA04063F.

55 R. R. Bhosale, G. D. Takalkar, Nanostructured co-precipitated Ce0.9Ln0.1O2 (Ln=La, Pr, Sm, Nd, Gd, Tb, Dy, or Er) for thermochemical conversion of CO2, Ceram. Int. 44 (2018) 16688-16697.

56 Narula C K, Haack L P, Chun W, Jen H-W, Graham G W. Single-phase $PrO_y$—$ZrO_2$ materials and their oxygen storage capacity: a comparison with single-phase $CeO_2$—$ZrO_2$, $PrO_y$—$CeO_2$, and $PrO_y$—$CeO_2$—$ZrO_2$ materials. J Phys Chem B 1999; 103:3634-3639.

57 L. Zhu, Y. Lu, Reactivity and Efficiency of Ceria-Based Oxides for Solar CO2 Splitting via Isothermal and Near-Isothermal Cycles, Energy Fuels 32 (2018) 736-746. https://doi.org/10.1021/acs.energyfuels.7b03284.

58 A. Bonk, A. C. Maier, M. V. F. Schlupp, D. Burnat, A. Remhof, R. Delmelle, A. Steinfeld, U. F. Vogt, The effect of dopants on the redox performance, microstructure and phase formation of ceria, J. Power Sources 300 (2015) 261-271. https://doi.org/10.1016/j.jpowsour.2015.09.073.

59 Meng Q-L, Li C, Kaneko H, Tamaura Y. Solar thermochemical process for hydrogen production via two-step water splitting cycle based on $Ce_{1-x}Pr_xO_{2-\delta}$ redox reaction, Thermochim. Acta 532 (2012) 134-138.

60 G. Takalkar, R. R. Bhosale, F. AlMomani S. Rashid, Co-precipitation synthesized nanostructured Ce(0.9)Ln(0.05)Ag(0.05)O(2-delta) materials for solar thermochemical conversion of CO2 into fuels, J. Mater. Sci. 55 (2020) 9748-9761. https://doi.org/10.1007/s10853-020-04567-w.

61 B. Zhao, C. Huang, R. Ran, X. Wu, D. Weng, Two-step thermochemical looping using modified ceria-based materials for splitting CO2, J. Mater. Sci. (2016) 51: 2299-2306. https://doi.org/10.1007/s10853-015-9534-7.

62 H. P. Dasari, K. Ahn, S.-Y. Park, H.-I. Ji, K. J. Yoon, B.-K. Kim, H.-J. Je, H.-W. Lee, J.-H. Lee, Hydrogen production from water-splitting reaction based on RE-doped ceria—zirconia solid-solutions, Int. J. Hydrogen Energy 38 (2013) 6097-6103. http://dx.doi.org/10.1016/j.ijhydene.2013.01.145 .

63 C.-I. Lee, Q.-L. Meng, H. Kaneko, Y. Tamaura, Dopant effect on hydrogen generation in two-step water splitting with CeO2—ZrO2—MOx reactive ceramics, Int. J. Hydrogen Energy 38 [36] (2013) 15934-15939. http://dx.doi.org/10.1016/j.ijhydene.2012.09.111.

64 Meng Q-L, Tamaura Y Enhanced hydrogen production by doping Pr into $Ce_{0.9}Hf_{0.1}O_2$ for thermochemical two-step water-splitting cycle. J Phys Chem Solids 2014; 25:328-333.

65 D. Arifin, A. Ambrosini, S. A. Wilson, B. Mandal, C. L. Muhich, A. W. Weimer, Investigation of Zr, Gd/Zr, and Pr/Zr—doped ceria for the redox splitting of water, Int. J. Hydrogen Energy 45 [1] (2020) 160-174. https://doi.org/10.1016/j.ijhydene.2019.10.177.

67 Roberts S, Dodson J, Carpinone P, Hagelin-Weaver H. Evaluation of nanoparticle zirconia supports in the thermochemical water splitting cycle over iron oxides. Int J Hydrogen Energy 2015; 40:15972-15984.

67 Elkins T W, Neumann B, Bäumer M, Hagelin-Weaver H E. Effects of Li doping on MgO-supported $Sm_2O_3$ and $TbO_x$ catalysts in the oxidative coupling of methane. ACS Catal 2014:4; 1972-1990.

Example 2

The present disclosure provides for a unique material, a mixed metal oxide consisting of $CeO_2$ (cerium dioxide) and $PrO_y$, where $1.5 \leq y \leq 2$ (praseodymium oxide with a mixed +3 and +4 valence state), which has very unusual properties in the thermochemical water-splitting process (FIG. 2.1). The material is synthesized by precipitating $Pr(OH)_z$ ($3 \leq z \leq 4$) onto commercially available $CeO_2$ nanoparticles using a $PrO_y$ precursor ($Pr(NO_3)_3 \cdot 6H_2O$) and a NaOH solution. Before activation, the material is thermally pretreated at 800° C. for four hours to decompose the $Pr(OH)_x$ and form a mixed metal oxide, $PrO_y/CeO_2$. This material is unique as it appears to retain water or hydroxyl groups in the matrix even at very high temperatures. During the regeneration step, i.e. heating to release oxygen, this material would release hydrogen after an initial oxygen release. This would happen during heating from 1,000 to 1450° C. Also, after the water-splitting step, i.e. after the hydrogen release was complete at 1,000° C., and the material was cooled down to room temperature under an inert flow, the $PrO_y/CeO_2$ material still appeared to be moist. This is a very unique behavior, and no other material is known which would behave in this manner during the thermochemical water-splitting cycle. These were, however, indications that this material would be very effective during isothermal operation. Therefore the material was tested during isothermal conditions, and the material does indeed produce a significant amount of hydrogen during isothermal operation. The amount of hydrogen released during isothermal operation is dependent on the temperature (FIG. 2.2).

Water-Splitting over $PrO_y/CeO_2$ Materials

Materials Tested:

| Material | Synthesis Method | Release of $H_2$ during regeneration step |
|---|---|---|
| $CeO_2$ nanoparticles | Commercially available | No |
| 1% $Tb/CeO_2$ – PPT | Precipitation | No |
| 10% $Tb/CeO_2$ – PPT | Precipitation | Yes |
| 10% $Tb/CeO_2$ – IWI | Incipient wetness impregnation | No |
| 10% $Pr/CeO_2$ – PPT | Precipitation | Yes |
| 10% $Pr/CeO_2$ – IWI | Incipient wetness impregnation | Yes |
| 1% $Pr/CeO_2$ | Precipitation | Yes |

All values are in weight percent.

Water-splitting cycles were run over Pr- and Tb-doped $CeO_2$ materials, and it was discovered that they exhibit some very unusual behavior. These materials would release hydrogen during the regeneration step (immediately following the release of oxygen). This was unexpected and suggests that these materials can hold on to hydroxyl groups at extremely high temperatures. Amongst the materials tested, only Tb- and Pr-doped materials exhibit this behavior (pure $CeO_2$, or Fe- and Zr-doped $CeO_2$ does not). Additional rare earth oxides may also exhibit this behavior. Furthermore, the precipitation method yields materials which release more hydrogen compared with materials synthesized via incipient wetness impregnation. Also, materials with 10% by weight (wt %) of Pr or Tb release more $H_2$ than those containing 1.0 wt % Pr (1.0 wt % Tb does not appear to be sufficient).

FIGS. 2.3A-2.3L are mass spectrometer data from typical cycles over a 10 wt % $PrO_y/CeO_2$ material synthesized via precipitation. Left panels (FIGS. 2.3A, 2.3C, 2.3E, 2.3G, 2.3I, 2.3K) are collected during heating to 1,450° C. when only He and Ar are flowing through the system (no water vapor is introduced). The red traces in the left panels of these graphs reveal the unusual behavior, as hydrogen is released when no water is introduced. Some materials will reveal a small peak during activation also, but this one does not. Each row represents one cycle (i.e. one activation or regeneration and one water-splitting step). After the fifth cycle, the hydrogen release in the left panel is very low. This indicated that isothermal operation would be possible for these materials, which was supported by the results in FIG. 2.2.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A method of making a crystalline compound having the formula $X_yCe_{1-y}O_2$ comprising:
    mixing $CeO_2$ nanoparticles in water to form a $CeO_2$ dispersion, wherein the $CeO_2$ nanoparticles have an average size of about 15 to 30 nm;
    mixing the $CeO_2$ dispersion with a nitrate of a rare earth element selected from praseodymium or terbium to form a second dispersion;
    precipitating the rare earth element as a hydroxide onto the $CeO_2$ nanoparticles to form modified $CeO_2$ nanoparticles;
    separating and drying the modified $CeO_2$ nanoparticles; and
    heating the modified $CeO_2$ nanoparticles to decompose the hydroxides to form a rare earth element oxide and to form the crystalline compound having the formula $X_yCe_{1-y}O_2$, wherein y is from 0.01 to 0.15, wherein X is Pr or Tb.

2. The method of claim 1, wherein precipitating includes adding sodium hydroxide to the second dispersion.

3. The method of claim 1, wherein heating includes heating at about 800-1000° C. for 2 to 6 hours.

4. The method of claim 1, wherein the crystalline compound has an average crystalline size of about 20 to 30 nanometers as determined by X-ray diffraction (XRD) data using the Scherrer equation prior to thermochemical water splitting and about 40 to 50 nanometers after 6 cycles of thermochemical water splitting.

5. The method of claim 1, wherein X is Pr.

6. The method of claim 5, wherein y is 0.1.

7. The method of claim 1, wherein X is Tb.

8. The method of claim 7, wherein y is 0.1.

* * * * *